United States Patent Office 3,392,192
Patented July 9, 1968

3,392,192
THIOCARBAMIC ACID INNER SALTS
Robert E. Malec, Chicago, Ill., assignor, by mesne assignments, to Armour Industrial Chemical Company, a corporation of Delaware
No Drawing. Filed Mar. 24, 1965, Ser. No. 442,473
4 Claims. (Cl. 260—501.12)

ABSTRACT OF THE DISCLOSURE

Inner salts of thiocarbamic acid of the formula:

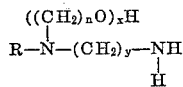

---

This invention relates to novel thiocarbamates and their use, and more particularly to a novel class of inner salts or zwitterions of thiocarbamic acid and to their use as corrosion inhibitors and as extreme pressure agents for lubricants.

There has recently been developed a new class of compounds; specifically, internally alkoxylated diamines. These diamines are usually made by reacting a long chain primary amine with acrylonitrile followed by alkoxylation with an alkylene oxide. The reaction product is then hydrogenated to give the following type compound:

Formula I

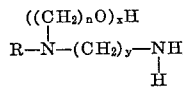

where

R is an aliphatic saturated or unsaturated hydrocarbon radical having from 8 to 22 carbon atoms such as derived from the natural fats and oils;
$n$ is an integer from 2 to 3;
$x$ is an integer from 1 to 25;
$y$ is an integer from 1 to 6.

An object of this invention is to provide novel thiocarbamates from compounds of Formula I.

Another object is to provide a novel method for the manufacture of said thiocarbamates.

Still another object is to provide novel compounds which are effective as corrosion inhibitors.

A further object is to provide novel compounds which are effective as extreme pressure agents in lubricating oils.

A still further object is to provide thiocarbamates which are extremely stable.

Other objects of the invention will in part be obvious and will in part appear hereinafter.

The invention accordingly comprises the several steps and the relation of one or more such steps with respect to each of the others, and the compound, and the composition of matter possessing the characteristics, properties, and the relation of constituents which are exemplified in the following detailed disclosure, and the scope of the invention will be indicated in the claims.

It has now been found that the internally alkoxylated diamines of Formula I above may be reacted with carbon disulfide to form a thiocarbamic acid inner-salt or zwitterion having the following formula:

Formula II

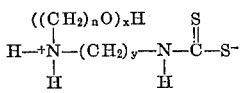

where

R is a member of the class consisting of an aliphatic saturated hydrocarbon radical, an unsaturated aliphatic hydrocarbon radical, each said radical having from 8 to 22 carbon atoms, and mixtures thereof, such as derived from the natural fats and oils;
$n$ is an integer from 2 to 3;
$x$ is an integer from 1 to 25;
$y$ is an integer from 1 to 6.

More particularly, when one or more internally alkoxylated diamines of Formula I above are dissolved in a solvent and then reacted with $CS_2$ by slow addition (about 1 hour or more) of the latter thereto, an amine thiocarbamate inner salt, or a mixture of amine thiocarbamate inner salts are formed in essentially quantitative yields. The reaction may be illustrated by the following chemical equation relating to an ethoxylated diamine:

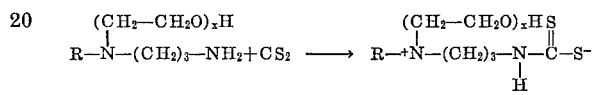

Unlike the corresponding product derived from a normal (or non-internally alkoxylated) diamine, the salts of this invention cannot condense to give the tetrahydropyrimidine-2-thione with a loss of hydrogen sulfide as follows:

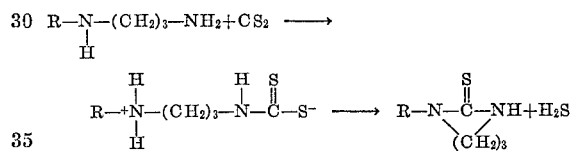

When the inner salts of this invention are added to lubricating oils or water soluble lubricants in the range of about 1 to 20% by weight, they exhibit both anticorrosive characteristics and extreme pressure agent characteristics. This makes them particularly valuable since water soluble lubricants are frequently fraught with corrosion problems.

The invention is more aptly described by reference to specific examples which illustrate the synthesis and use of the salts of this invention.

EXAMPLES I to IV

| Example | R[1] | X[1] | Activity, Percent | Solvent |
|---|---|---|---|---|
| 1 | Coco | 1.0 | 75 | n-Butanol. |
| 2 | Oleyl | 1.5 | 75 | Mineral Seal Oil. |
| 3 | do | 1.5 | 75 | n-Butanol. |
| 4 | Tallow | 1.5 | 75 | Do. |

[1] See Formula II.

In the preparation of the above amine thiocarbamate inner salts, carbon disulfide is added to a solution of the ethoxylated diamine and the solvent indicated, over a one hour period while stirring. The reaction is exothermic and the stirring is continued until the product cools to room temperature. The yields of the thiocarbamate salts, in most instances, are essentially quantitative.

EXAMPLE V

Lubricity

The following load data are obtained on a Falex Lubricant Tester. After a 5 minute break-in period at 250 lbs., the load is increased automatically until failure. Table 1 illustrates the data obtained.

TABLE 1

| Test No. | Oil | Failing Load (ob.) |
|---|---|---|
| 1 | 95% Base oil[1] +5% sulfurized sperm oil (13% sulfur). | 1,500 |
| 2 | 95% Base oil[1] +5% Example 2 | 2,500 |

[1] Calumet 406 Oil, marketed by Calumet Refining Co., Chicago, Illinois

EXAMPLE VI

To improve the extreme pressure properties of a water soluble lubricant, 0.4% of the salt of Example 3 plus 1.6% emulsifiers are added. The following data show that the additive has no deleterious effect on wear at normal loads but has greatly increased the ability of the lubricant to withstand periods of extreme load without causing seizing, galling or extreme wear of metal parts:

TABLE 2

| No. | Sample | Wear Test on Baroid Mud Tester, 24 hr. 40 in. lb. (mg.) | Load Test on Falex Tester (lb.) |
|---|---|---|---|
| 1 | Commercial water lubricant | 6.0 | 2,000 |
| 2 | do | 5.6 | 4,250 |

Plus 0.4% of the compound of Example 3, plus 0.7% of Ethofat 242/25 (an emulsifier marketed by Armour and Company), plus 0.9% of Aromox C/12 (an emulsifier marketed by Armour and Company).

EXAMPLE VII

The following tests demonstrate that the salts of the instant disclosure are non-corrosive and probably anti-corrosive. The tests are conducted in closed 4 oz. bottles with the 1020 mild steel coupons half immersed in the oil.

TABLE 3.—120° F.—48-HOUR CORROSION TEST

| Test No. | Sample | Appearance of Coupon |
|---|---|---|
| 1 | Example No. 2 | No rust or corrosion. |
| 2 | Example No. 2+0.5% water | Do. |
| 3 | Paraffin oil+5% Example 2 | Do. |
| 4 | Paraffin oil+5% Example 2+0.5% water. | Do. |

The alkoxylated diamines of Formula I that may be used to form the novel thiocarbamates of this invention are of varying scope.

They may be the ethoxylated or propoxylated derivatives or mixtures thereof with from one to 25 moles of the alkylene oxide group contained therein.

The alkyl radical R may comprise octyl, nonyl, decyl, undecyl, dodecyl, tridecyl, tetradecyl, pentadecyl, hexadecyl, heptadecyl, octadecyl, nonadecyl, eicosyl, heneicosyl, docosyl, oleyl, heptadecenyl, linoleyl, heptadecadienyl and mixtures thereof such as those found in natural fats and oil mixtures particularly tallow, coconut, cottonseed, soybean and tall oil.

The alkoxylated diamine may also be a mono-, di-, tri-, tetra-, penta- or hexamethylene type diamine.

The solvents into which said alkoxylated diamines may be dissolved for reaction media purposes may be polar solvents, such as methanol, ethanol, n-or isopropanol, n- or isobutanol or nonpolar solvents, such as chloroform, ethylene chloride, carbon tetrachloride, benzene, ether, naphtha and the like or mixtures thereof.

Temperatures of reaction in forming the acid should be within the range of 0 to 100° C. with a preference for room temperature between 20° to 30° C.

In the use of the thiocarbamate inner salts of this invention as anti-corrosive agents, for oil or water based lubricants or other oils or oil-like materials, 0.1 to 20% by weight is usually sufficient and the preferred amount is 5%. The same concentrations are used when the thiocarbamate inner salts of this invention are used for their extreme pressure imparting characteristics. With respect to the latter characteristic, the thiocarbamate inner salts may be used in any petroleum base oil or water based lubricant and when so used, the lubricity thereof, especially its high pressure characteristic will be improved.

It will thus be seen that the objects set forth above, among those made apparent from the preceding description, are efficiently attained, and, since certain changes may be made in carrying out the process, the product, and the composition of matter all described above, without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. The novel inner salts of thiocarbamic acid of the following formula:

$$R-\overset{((CH_2)_nO)_xH}{\underset{H}{\overset{|}{N^+}}}-(CH_2)_y-\overset{}{\underset{H}{\overset{|}{N}}}-\overset{S}{\overset{\|}{C}}-S^-$$

where
R is a member of the class consisting of an aliphatic saturated hydrocarbon radical, an unsaturated aliphatic hydrocarbon radical, each said radical having from 8 to 22 carbon atoms, and mixtures thereof;
$n$ is an integer from from 2 to 3;
$x$ is an integer from 1 to 25;
$y$ is an integer from 1 to 6.

2. The salts of claim 1 wherein the R radical comprises a mixture of aliphatic saturated and unsaturated hydrocarbon radicals derived from coconut oil.

3. The salts of claim 1 wherein the R radical comprises a mixture of aliphatic saturated and unsaturated hydrocarbon radicals derived from tallow.

4. The salts of claim 1 where the R radical comprises an oleyl radical.

References Cited

UNITED STATES PATENTS

| 2,302,749 | 11/1942 | Dean | 260—501 |
| 2,827,483 | 3/1958 | Fishback et al. | 260—501 |
| 2,812,306 | 11/1957 | Liehe | 252—33.6 |
| 3,151,076 | 9/1964 | Epton et al. | 252—33.6 |
| 2,561,208 | 7/1951 | Kirk | 260—501 |

LORRAINE A. WEINBERGER, *Primary Examiner.*

DANIEL E. WYMAN, *Examiner.*

C. F. DEES, M. WEBSTER, *Assistant Examiners.*